United States Patent [19]

Shaw

[11] 3,743,347

[45] July 3, 1973

[54] SAFETY CHASSIS

[76] Inventor: Barney Pirofsky Shaw, 110 Elmendorf Street, Kingston, N.Y. 12401

[22] Filed: Jan. 25, 1971

[21] Appl. No.: 109,231

[52] U.S. Cl. ........................... 296/35 R, 296/65 A
[51] Int. Cl. ............................................. B60r 21/02
[58] Field of Search ............ 296/35 R, 35 A, 65 A; 180/82; 105/5

[56] References Cited
UNITED STATES PATENTS

| | | | |
|---|---|---|---|
| 3,162,479 | 12/1964 | Hewitt | 296/35 R |
| 3,556,584 | 1/1971 | Simon | 296/65 A |
| 1,141,248 | 6/1915 | Kadlec | 296/35 R |
| 1,697,198 | 1/1921 | Martin | 296/35 A |
| 3,479,080 | 11/1969 | Hilfiker | 296/35 R |
| 3,508,783 | 4/1970 | Schlanger | 296/35 R |

FOREIGN PATENTS OR APPLICATIONS

| | | | |
|---|---|---|---|
| 705,020 | 3/1931 | France | 296/35 R |

*Primary Examiner*—Leo Friaglia
*Assistant Examiner*—John A. Pekar
*Attorney*—Robert W. Fiddler

[57] ABSTRACT

A vehicle chassis formed in two parts subject to being separated in the event of collision to displace the passengers from the line of collision and acting to dissipate the energy of collision and prevent such energy from being transmitted to the passengers. The novel chassis is formed with a passenger supporting portion separable from the rest of the vehicle and arranged to ride upwardly over inclined planes in the event of collision of the vehicle. This is accomplished by forming the passenger supporting portion of the chassis, separate from the engine supporting chassis portion, and coupling the passenger supporting chassis portion to the engine supporting portion along an inclined plane, and arranging wedges along the side of the passenger supporting chassis, so that upon impact, the energy of impact will be taken up by one chassis portion moving relative to the other chassis portion along said inclined plane, or said wedges with the passenger supporting chassis portion moved upwardly away from the rest of the vehicle thus minimizing the likelihood of the passenger colliding with any part of the vehicle.

4 Claims, 9 Drawing Figures

PATENTED JUL 3 1973 3,743,347

INVENTOR
BARNEY PIROFSKY SHAW
BY
ATTORNEY:

SAFETY CHASSIS

BACKGROUND OF THE INVENTION

This invention relates to the art of collision protection for the occupants of motor driven vehicles, and more particularly to an improved vehicle chassis construction serving to minimize the transference of impact energy to the occupants of a vehicle upon the occurrence of a collision.

With the increasing mortality rate of passengers in vehicles involved in auto collisions arising from the increased use of motor vehicles, and the increased rate of speed at which they are operated, the problem of protecting the passenger in a vehicle has been faced in a variety of fashions.

Thus bumpers on the vehicles have been cushioned, or otherwise mounted to take up shock loads, as shown for example in U.S. Pat. No. 3,068,039; or shear means have been interposed between the bumper and the vehicle to take up shock load as shown in U.S. Pat Nos. 3,081,119, or 3,845,144.

Additionally, safety belts have come into widespread use, as required by existing safety regulations to strap the vehicle occupants in position so as to minimize their being thrown against the vehicle interior during collision.

Though a variety of shock absorbing devices, and passenger restraining devices have been evolved, as noted above, the passenger in vehicles provided with such devices is still subject to injury in the event of collision of the vehicle in which he is riding by virtue of the fact that depending on the severity of the collision, various parts of the vehicle may impinge upon the passenger. Thus even with safety belts, passengers are often injured by virtue of the fact that the engine is often driven back into the passenger compartment by the force of the collision, with the passengers being injured by the dashboard, or even the engine moving against them. Other injuries often result when the external car moves into the passenger compartment of the struck vehicle.

BRIEF DESCRIPTION OF THE INVENTION

It is with the above considerations in mind, that the present improved vehicle chassis has been evolved serving to dissipate shock loads, and remove the passenger from the main line of force of the collision, and from the vicinity of the engine compartment.

It is accordingly among the primary objects of this invention to provide an improved vehicle chassis minimizing shock loads on the occupants of the vehicle in the event of collision.

A further object of the invention is to provide an improved vehicle chassis dissipating any shock loads occurring during collision of the vehicle.

A further object of the invention is to provide an improved vehicle chassis serving to remove the vehicle occupants from the main line of transfer of shock loads occurring during collision of the vehicle.

Another object of the invention is to provide an improved vehicle chassis serving to separate the occupants of the vehicle from the path of movement of the vehicle engine during the course of collision.

Another object of the invention is to provide an improved vehicle chassis serving to separate the occupants of the vehicle from the path of movement of a second vehicle with which the passenger occupied vehicle may collide.

These and other objects of the invention which will become hereafter apparent are achieved by forming a vehicle chassis with a passenger supporting portion of the chassis separable from the rest of the vehicle. The engine supporting portion of the chassis is coupled to the passenger supporting portion of the chassis along an inclined plane chassis portion, with the inclined plane chassis portions connected by shear pins of a strength sufficient to maintain the chassis portions in operable position during normal use of the vehicle, but subject to shearing under an impact load such as occurs during a passenger injuring collision. Additionally, inclined planes are provided by wedges arranged along the side of the passenger supporting chassis portion so that a lateral collision will displace the passenger compartment from the line of collision.

A feature of the invention resides in the formation of the inclined planes or wedges such that the passenger compartment is displaced upwardly over the engine compartment in the event of collision, thereby minimizing the likelihood of injury of the passengers by the engine entering the passenger compartment, and bringing the passenger above the main line of thrust of the line of collision.

Another feature of the invention resides in the fact that the novel chassis may readily be employed in a conventional vehicle without effecting the exterior appearance of the vehicle body.

BRIEF DESCRIPTION OF THE DRAWINGS

The specific details of a preferred embodiment of the invention, and their mode of functioning, will be particularly pointed out in clear, concise, and exact terms in conjunction with the accompanying drawings, wherein.

DESCRIPTION OF PREFERRED EMBODIMENTS OF INVENTION

Referring now more particularly to the drawings, like numerals in the various figures will be employed to designate like parts.

Figure 1:
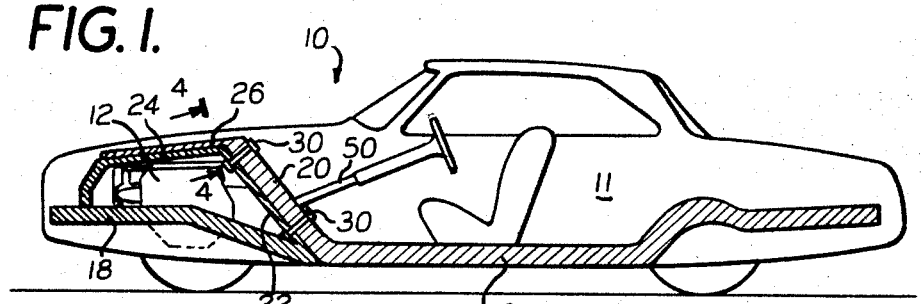
FIG. 1 is a schematic elevational view of an automobile shown provided with a safety chassis shown in cross section, incorporating the teachings of this invention.
Figure 2:
FIG. 2 is a diagrammatic illustration showing the position of a passenger in a vehicle provided with the safety chassis during normal operation of the vehicle.

As best seen in FIG. 1, the invention is shown as embodied in connection with an automobile 10 having the conventional passenger compartment 11 and forward engine compartment 12.

According to the invention, the chassis of the vehicle, shown in cross hatching in FIG. 1 is formed in two parts, with a passenger supporting chassis portion 16 and an engine supporting chassis portion 18.

The passenger supporting chassis portion 16 is formed at its front end with an upwardly extending inclined plane portion 20 which is arranged to overlie a mating inclined plane 22 formed integrally with the rear end of the engine supporting chassis portion 18. According to the illustrated preferred embodiment shown in FIG. 1, the engine supporting chassis portion 18 is formed with an upper strut 24 extending substantially horizontally from the upper end of the inclined plane portion 22 over the engine to provide a guide track in the event of override of the passenger portion of the chassis with respect to the engine supporting chassis portion 18. It is further preferred to provide a mating horizontally extending strut portion 26 on the upper end of inclined plane portion 20 of the passenger supporting chassis portion 16, to insure desired attachment of the passenger supporting chassis portion 16 to the engine supporting chassis portion 18 as hereinafter described.

Figure 4:
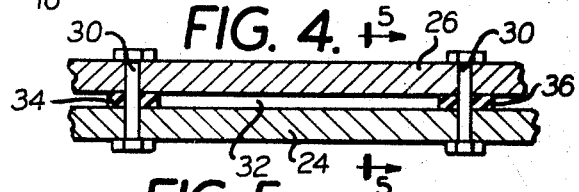
FIG. 4 is a cross sectional view taken on line 4—4 of FIG. 1 showing a proposed vacuum connection between the passenger supporting portion of the chassis, and the motor supporting portion of the chassis.
Figure 5:
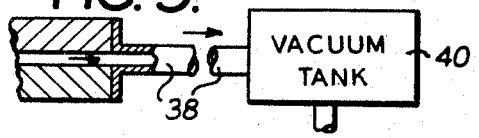
FIG. 5 is a cross sectional view taken on line 5—5 of FIG. 4, along with a schematic illustration of a connection to a vacuum tank and intake manifold to provide the desired vacuum.

In order to maintain the engine supporting chassis portion 18 in operative relationship with respect to the passenger supporting chassis portion 16, as best seen in FIGS. 4 and 5, shear bolts 30 are preferably arranged between the chassis portions. In the illustrated preferred embodiment, additional securement with respect to the chassis portions is obtained by forming a vacuum chamber 32 between struts 24 and 26, with pressure seals 34 and 36 arranged to provide a relatively air tight connection between the chassis strut portions 24 and 26. A desired vacuum is formed in this vacuum chamber 32 by means of a connection 38 to vacuum tank 40 which is preferably connected to the intake manifold of the engine to provide a desired vacuum.

In addition to the inclined plane supporting the passenger compartment with respect to the engine compartment provided by the inclined plane chassis elements 20 and 22, the passenger compartment 11 is further supported on laterally spaced wedges 42 and 44 arranged at opposite sides of the passenger compartment 11 of the vehicle. In the illustrated embodiment, these wedges are supported beneath the chassis portion 16 on the opposite sides thereof. It will of course be understood by those skilled in the art that the wedges may be arranged above the chassis 16 to abut against a rear support, the positioning of the wedges being selected such as to insure displacement of the passenger out of the path of any collision.

In the illustrated preferred arrangement the steering column 50 is shown as pivoted at a pivot point 51 located outside the passenger compartment 11 so that the column 50 will be moved away from the passengers in the event of collision.

OPERATION

In use, a vehicle 10 is formed with a two part chassis provided with an inclined plane between a passenger supporting portion of the chassis, and an engine supporting portion of the chassis, and preferably with wedges laterally spaced at the side of the vehicle adjacent the passenger supporting chassis portion 16.

Figure 3:
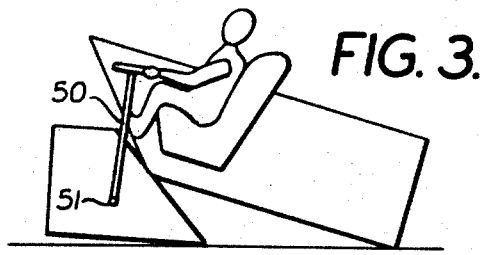
FIG. 3 is a diagrammatic illustration showing what happens to a passenger in the passenger portion of the vehicle in the event of a front or rear collision, indicating the movement of the steering column, away from the passenger.
Figure 7:
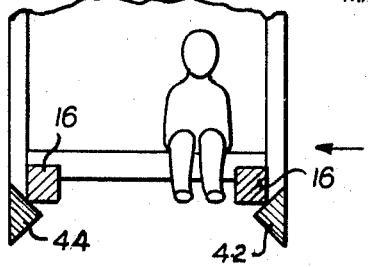
FIG. 7 is a cross sectional view through the passenger compartment of the vehicle shown in FIG. 6, showing the position of the lateral wedges during normal operation of the vehicle.
Figure 6:
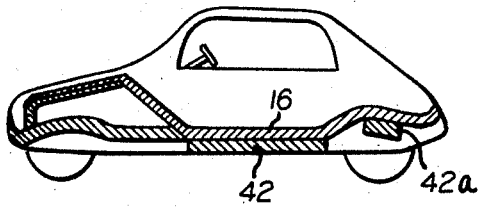
FIG. 6 is a schematic elevational view of an automobile shown provided with safety chassis as illustrated in FIG. 1, along with lateral collision wedges serving to elevate the passenger compartment out of the path of a collision from the side of the vehicle.

In the event of a collision producing thrust forces along a longitudinal axis of the vehicle, as in the event of collision of the vehicle with an object in front of the vehicle, or with an object or vehicle to the rear of the vehicle, the collision forces will break the shear pins 30 and separate the passenger supporting chassis portion 16 from the engine supporting chassis portion 18, so that the passenger will be moved to the position illustrated in FIG. 3. The steering column 50 which is pivoted at 51, will pivot to the position shown in FIG. 3, as a result of the relative movement of the chassis portions 16 and 18 to move the steering wheel away from the passenger.

Figure 8:
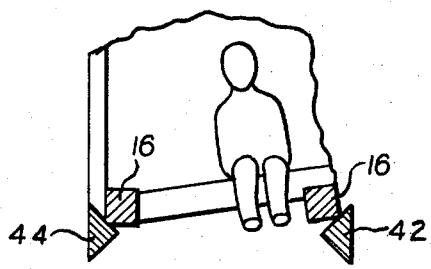
FIG. 8 is a schematic view illustrating the action of the lateral wedges displacing the passenger compartment in the event of a slide collision.
Figure 9:
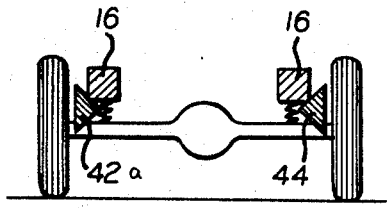
FIG. 9 is a cross sectional view over the rear axle of the automobile shown in FIG. 6, showing the position of the wedges.

In the event of a lateral collision, the side thrust will move a wedge 42 or 44 on the side of the thrust against the vehicle supporting chassis portion 16, displacing the passenger compartment to the position illustrated in FIG. 8, again removing the passenger from the line of force of the collision.

It is thus seen that by the simple expedient of providing inclined planes supporting the passenger compartment of a vehicle with respect to the engine compartment, and the side of the vehicle, any collision forces imparted to the vehicle will result in the passenger compartment being moved out of the line of force of the collision, thereby protecting the passenger occupants.

It will be understood by those skilled in the art that though the invention has been disclosed in connection with a front engine type of vehicle, the inventive concept may readily be embodied in vehicles with rear or mid-section engines.

The above disclosure has been given by way of illustration and elucidation, and not by way of limitations, and it is desired to protect all embodiments of the herein disclosed inventive concept within the scope of the appended claims.

What is claimed is:

1. A vehicle safety chassis insuring the displacement of passengers in a vehicle from the line of collision in the event of collision of the vehicle, said safety chassis comprising two separable longitudinally extending chassis portions, a first of said two chassis portions underlying the passenger compartment of the vehicle, said passenger compartment supporting chassis portion formed with an inclined plane portion extending upwardly and away from the passenger occupying areas of the vehicle; and a second of said two chassis portions comprising an engine supporting chassis portion; a mating inclined plane portion on said engine supporting chassis portion against which said passenger supporting inclined plane portion abuts during normal operation of the vehicle; and a vacuum chamber connecting said inclined plane portion of said first and second chassis portions, said vacuum chamber subject to separation under shock load to permit said first chassis portion to ride over said mating plane portion, raising the passengers out of the line of collision.

2. A vehicle safety chassis as in claim 1 in which shear pins extend between said inclined plane portions, said shear pins subject to separation under shock load.

3. A vehicle safety chassis as in claim 1 in which wedges are arranged along the side of said passenger supporting chassis portion to move against a lower surface of said chassis portion in the event of a lateral collision.

4. A vehicle safety chassis as in claim 1 in which a pivotally mounted steering column extends into the passenger compartment, pivoted at a point outside said passenger compartment to move away from the compartment in the event of collision.

* * * * *